United States Patent
Chasen et al.

(10) Patent No.: US 10,479,515 B2
(45) Date of Patent: Nov. 19, 2019

(54) DUAL MODE SUPPLEMENTAL STRUT AND DAMPER

(71) Applicant: Sikorsky Aircraft Corporation, Stratford, CT (US)

(72) Inventors: Scott A. Chasen, Orange, CT (US); William A. Welsh, North Haven, CT (US); Chris John Biehl, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 224 days.

(21) Appl. No.: 15/606,625

(22) Filed: May 26, 2017

(65) Prior Publication Data

US 2018/0044027 A1 Feb. 15, 2018

Related U.S. Application Data

(60) Provisional application No. 62/373,052, filed on Aug. 10, 2016.

(51) Int. Cl.
| | |
|---|---|
| *B60B 35/10* | (2006.01) |
| *B64D 27/10* | (2006.01) |
| *F16F 7/08* | (2006.01) |
| *B64C 27/00* | (2006.01) |

(52) U.S. Cl.
CPC ............ *B64D 27/10* (2013.01); *B64C 27/001* (2013.01); *F16F 7/08* (2013.01); *B64C 2027/002* (2013.01)

(58) Field of Classification Search
CPC . B64C 9/02; B64C 9/16; F16C 23/082; F16C 19/46; F16C 2326/43; Y10T 29/53104

USPC ......................... 280/86.75; 384/59, 449, 463
See application file for complete search history.

(56) References Cited

U.S. PATENT DOCUMENTS

| | | | | |
|---|---|---|---|---|
| 2,660,387 | A * | 11/1953 | Roy ...................... | F16F 1/3615 248/574 |
| 3,145,012 | A * | 8/1964 | Kfoury .................... | F16F 7/08 188/380 |
| 3,905,661 | A * | 9/1975 | Orr ......................... | F16C 19/54 180/9.62 |
| 4,863,329 | A | 9/1989 | Wilson | |
| 5,082,387 | A * | 1/1992 | DeVries .................. | F16B 39/24 403/146 |
| 5,101,533 | A * | 4/1992 | Stenger ................ | E05D 11/087 16/339 |
| 5,369,952 | A | 12/1994 | Walters | |
| 5,456,047 | A | 10/1995 | Dorka | |
| 7,263,806 | B2 * | 9/2007 | Pellegrino ............ | A47B 47/021 248/564 |
| 7,419,145 | B2 * | 9/2008 | Lee ........................ | F16F 7/082 213/32 R |

(Continued)

*Primary Examiner* — Toan C To
(74) *Attorney, Agent, or Firm* — Cantor Colburn LLP

(57) ABSTRACT

A strut for mounting an engine in an aircraft includes a first member and a second member. A friction material is coupled to a surface of the first member and is positioned between the first member and the second member. At least one attachment couples the first member, the second member, and the friction material. A biasing mechanism is associated with the at least one attachment. A biasing force of the biasing mechanism biases the second member into engagement with the frictional material to create a static frictional load between the first member and the second member.

15 Claims, 7 Drawing Sheets

(56) References Cited

U.S. PATENT DOCUMENTS

| | | | | |
|---|---|---|---|---|
| 8,226,028 B2* | 7/2012 | Marche | ................ | B64D 27/12 |
| | | | | 244/54 |
| 9,316,279 B2* | 4/2016 | Meisel | .................... | E04H 9/021 |
| 2010/0187367 A1* | 7/2010 | Dahl | ......................... | B64C 9/02 |
| | | | | 244/213 |
| 2011/0018214 A1* | 1/2011 | Kondo | ................ | B60G 15/067 |
| | | | | 280/5.515 |
| 2018/0094687 A1* | 4/2018 | Whiteford | ............. | F16F 15/126 |

\* cited by examiner

DUAL MODE SUPPLEMENTAL STRUT AND DAMPER

CROSS-REFERENCE TO RELATED APPLICATIONS

This application claims the benefit of Provisional Application Ser. No. 62/373,052, filed Aug. 10, 2016, which is incorporated herein by reference in its entirety.

BACKGROUND OF THE INVENTION

The subject matter disclosed herein relates to an engine mount of an aircraft, and more particularly, to an engine mount A propulsion engine, such as a gas turbine engine, may be mounted at various points of an aircraft, such as the wings, fuselage, or generally at the rear, by one or more struts. The primary function of the struts is to ensure the transmission of mechanical forces between the engine and the structure of the aircraft. During high speed operation, vibrations originating at the air vehicle, or rotor system, such as due to rotor wake interaction, main rotor vibrations and/or other destabilizing forces may be transmitted to the engine case, resulting in degraded operational performance and reduced lifespan. There is therefore a need to reduce vibration transmission to and from an engine without overly constraining the engine.

BRIEF DESCRIPTION OF THE INVENTION

According to one embodiment of the invention, a strut for mounting an engine in an aircraft includes a first member and a second member. A friction material is coupled to a surface of the first member and is positioned between the first member and the second member. At least one attachment couples the first member, the second member, and the friction material. A biasing mechanism is associated with the at least one attachment. A biasing force of the biasing mechanism biases the second member into engagement with the frictional material to create a static frictional load between the first member and the second member.

In addition to one or more of the features described above, or as an alternative, in further embodiments the strut is operable in one of a first mode and a second mode in response to a load applied to at least one of the first member and the second member.

In addition to one or more of the features described above, or as an alternative, in further embodiments in the first mode, the strut operates as a solid strut such that the first member does not move relative to the second member while passing the load from the first member to the second member.

In addition to one or more of the features described above, or as an alternative, in further embodiments the strut is operable in the first mode when the load applied to at least one of the first member and the second member is less than the static frictional load.

In addition to one or more of the features described above, or as an alternative, in further embodiments in the second mode, the first member slides relative to the second member under a vibratory load such that the strut operates as a damper to the vibratory load.

In addition to one or more of the features described above, or as an alternative, in further embodiments the strut is operable in the second mode when the load applied to at least one of the first member and the second member exceeds the static frictional load of the strut due to vibratory loads.

In addition to one or more of the features described above, or as an alternative, in further embodiments the attachment extends through at least one slot formed in the second member, such that the second member is movable relative to the friction material and the first member.

In addition to one or more of the features described above, or as an alternative, in further embodiments movement of the second member relative to the frictional material and the first member partially relieves a load applied to one of the first member and the second member by allowing relative movement between the first second member until the static frictional load is below a threshold at which point the static frictional load prevents additional movement between the first and second members.

In addition to one or more of the features described above, or as an alternative, in further embodiments the frictional material and the second member are disposed within a cavity defined by the first member.

In addition to one or more of the features described above, or as an alternative, in further embodiments the friction material is positioned adjacent a surface of the second member and another friction material is positioned adjacent an opposite surface of the second member.

In addition to one or more of the features described above, or as an alternative, in further embodiments the friction material coupled to a surface of the first member includes a plurality of friction materials.

In addition to one or more of the features described above, or as an alternative, in further embodiments the strut is configured for mounting an engine in an aircraft.

In addition to one or more of the features described above, or as an alternative, in further embodiments the first member is connected to a portion of the engine and the second member is connected to a fuselage of the aircraft.

In addition to one or more of the features described above, or as an alternative, in further embodiments the first member is connected to a fuselage of the aircraft and the second member is connected to a portion of the engine.

According to another embodiment, an aircraft includes an engine and a strut for mounting the engine to an adjacent component. The strut is operable in one of a plurality of modes in response to a load applied to at least one of the first member and the second member.

In addition to one or more of the features described above, or as an alternative, in further embodiments the plurality of modes includes a first mode where the strut operates as a solid strut.

In addition to one or more of the features described above, or as an alternative, in further embodiments the plurality of modes includes a second mode where the strut allows relative movement between a first member and a second member if the frictional force generated between the first member and the second member is overcome.

In addition to one or more of the features described above, or as an alternative, in further embodiments plurality of modes includes a third mode where the strut absorbs vibration from the engine between the first member and the second member.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
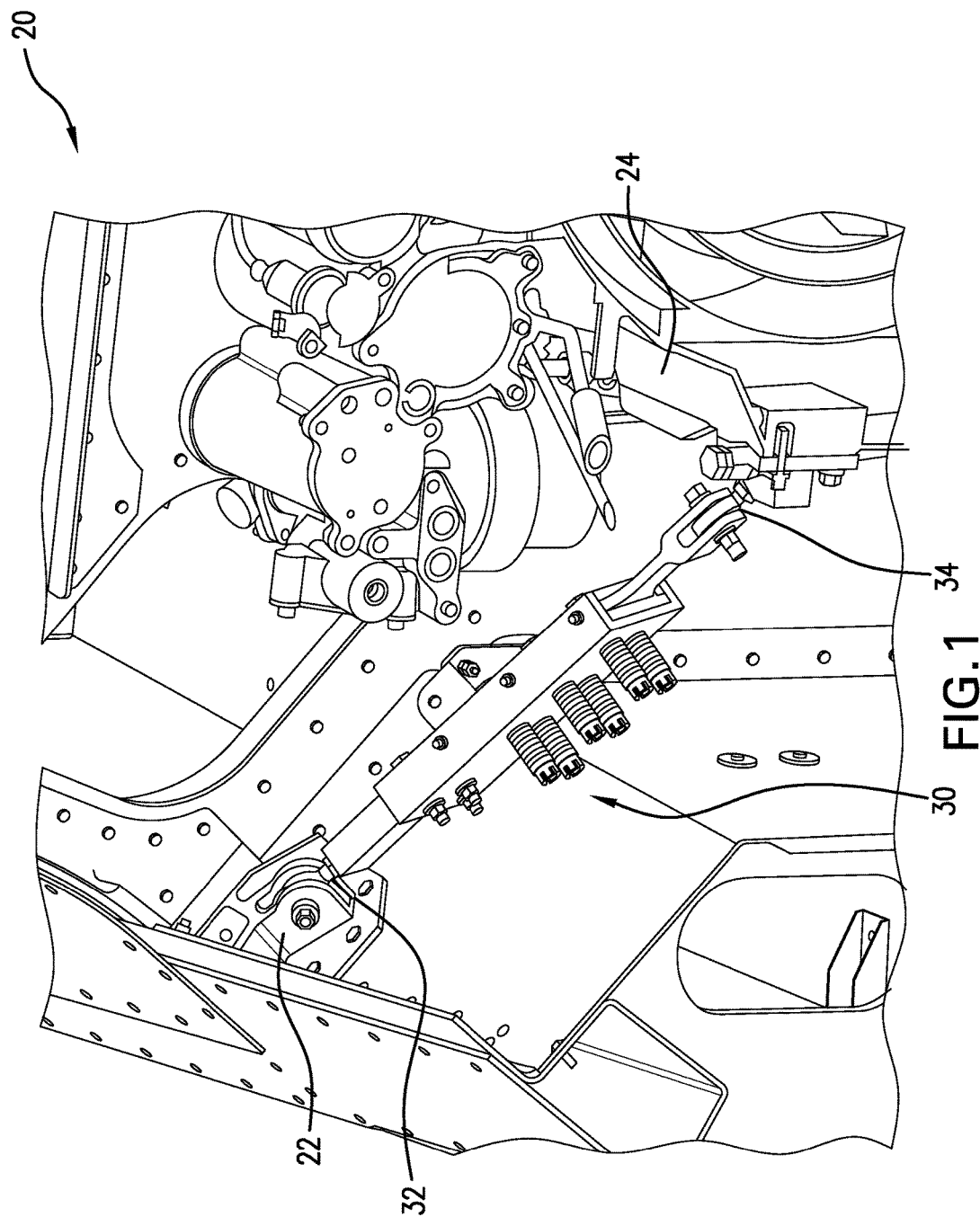
FIG. 1 is a perspective view of a portion of an aircraft having an engine mounted using a strut according to an embodiment.
Figure 2:
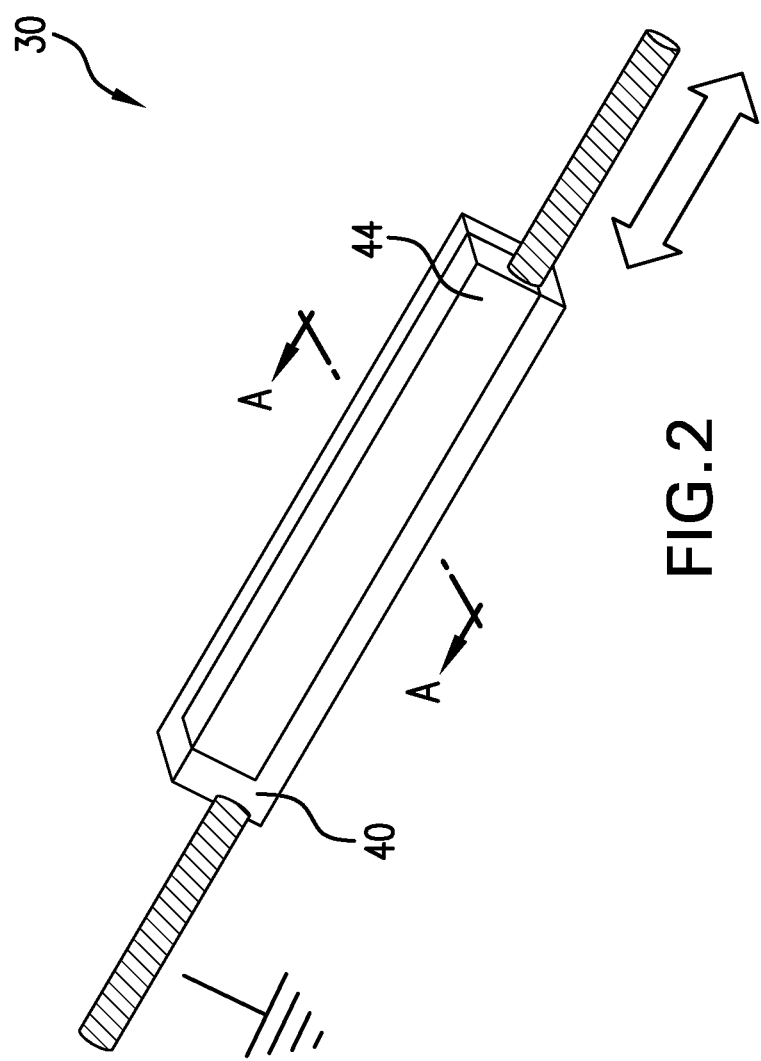
FIG. 2 is a perspective view of a strut according to an embodiment.
Figure 3:
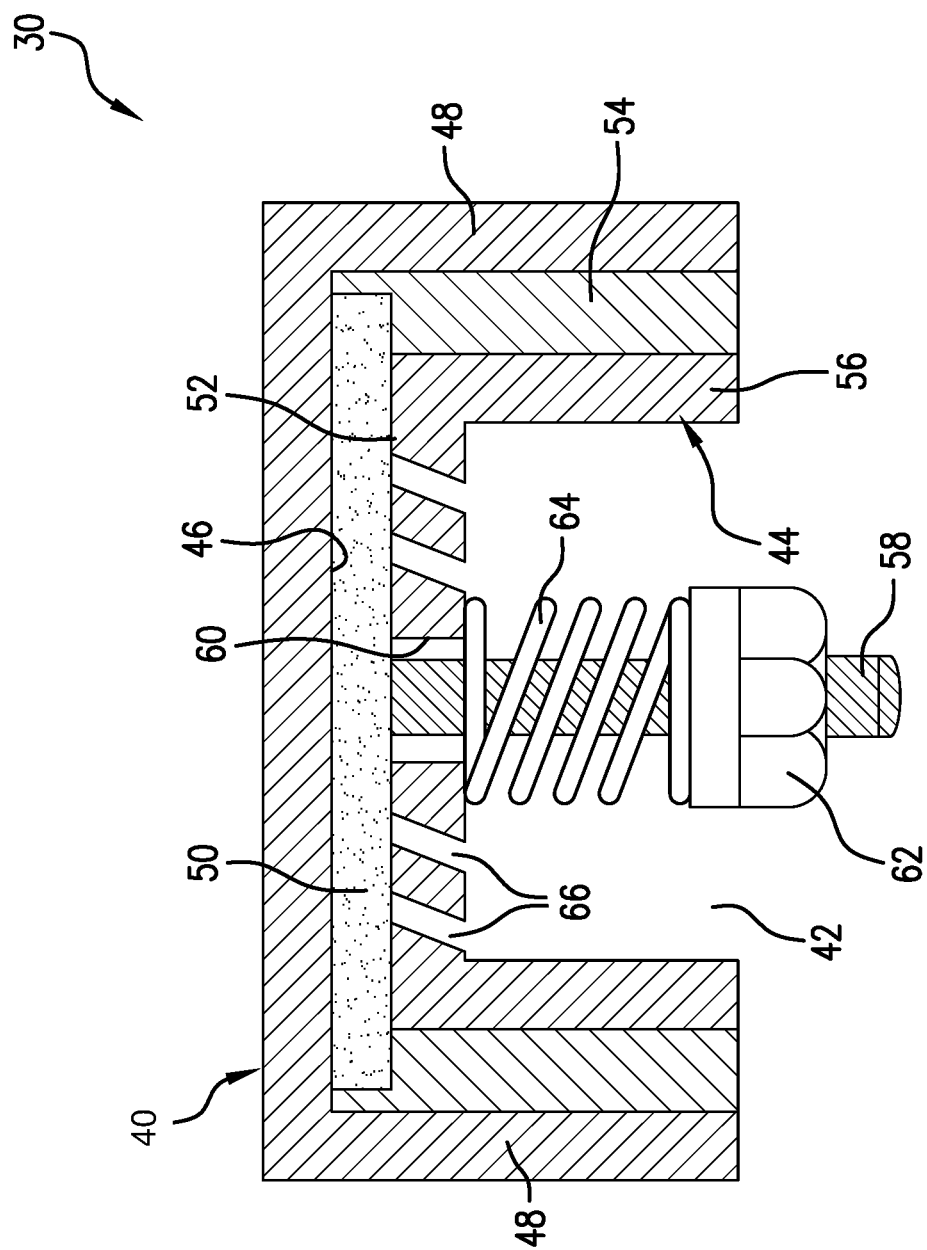
FIG. 3 is a cross-sectional view of the strut of FIG. 2 to an embodiment.

Referring now to FIG. 1, an aircraft 20 includes an engine 24 mounted using one or more engine struts 30. A first end 32 of the engine strut 30 is fixed to a structural element 22 of the aircraft 20, such as a wing or a fuselage for example, and a second, opposite end 34 of the engine strut 30 is affixed to a portion of an engine 24, for example an engine mount point. Although the first and second ends 32, 34 of the strut 30 are shown as being attached via a clevis-type fastener, other known connections are considered within the scope of the disclosure.

Figure 4:
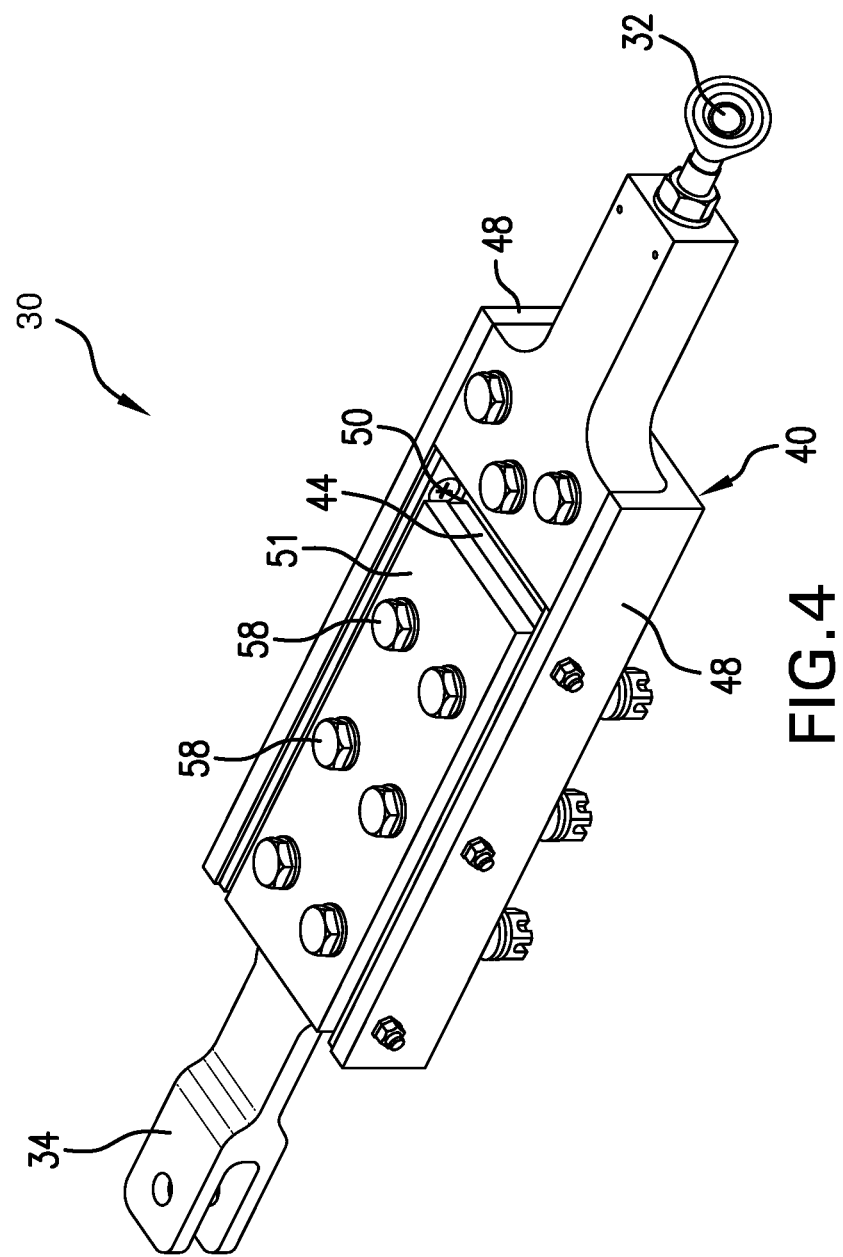
FIG. 4 is a perspective view of another strut according to an embodiment.
Figure 5:
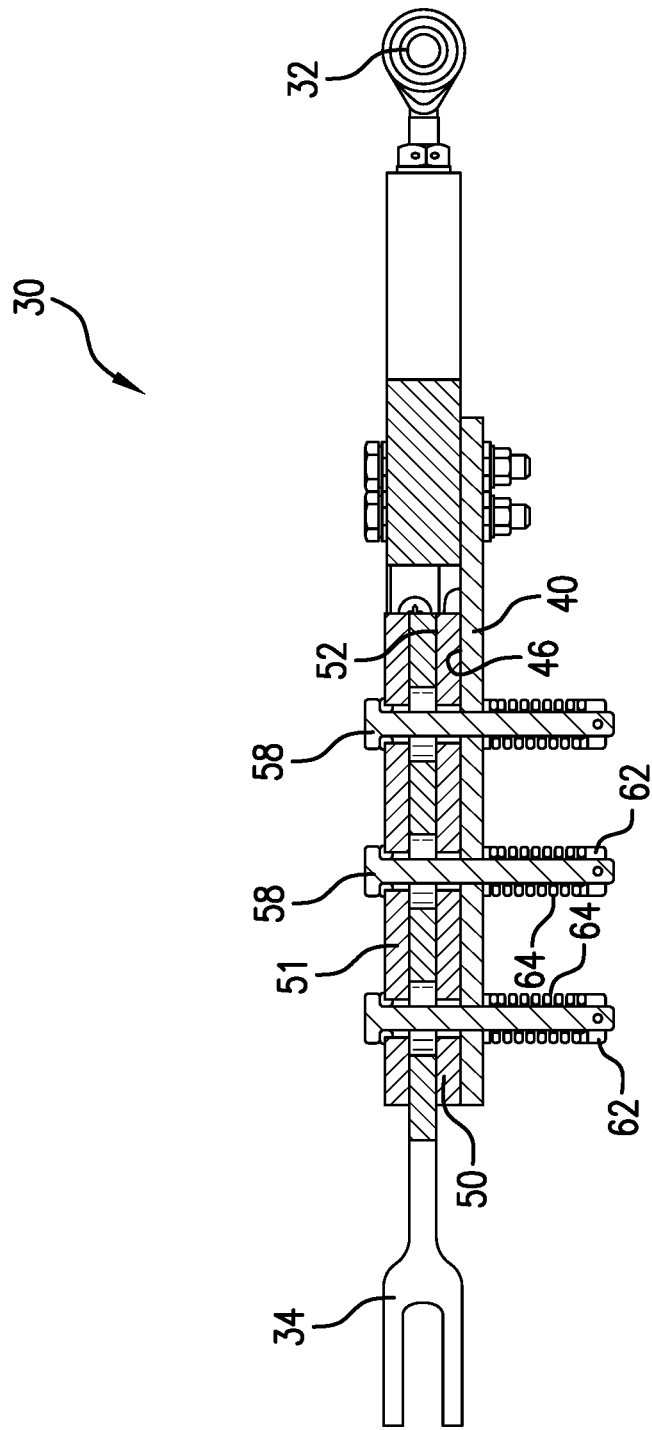
FIG. 5 is a cross-sectional view of the strut of FIG. 4 according to an embodiment.
Figure 6:
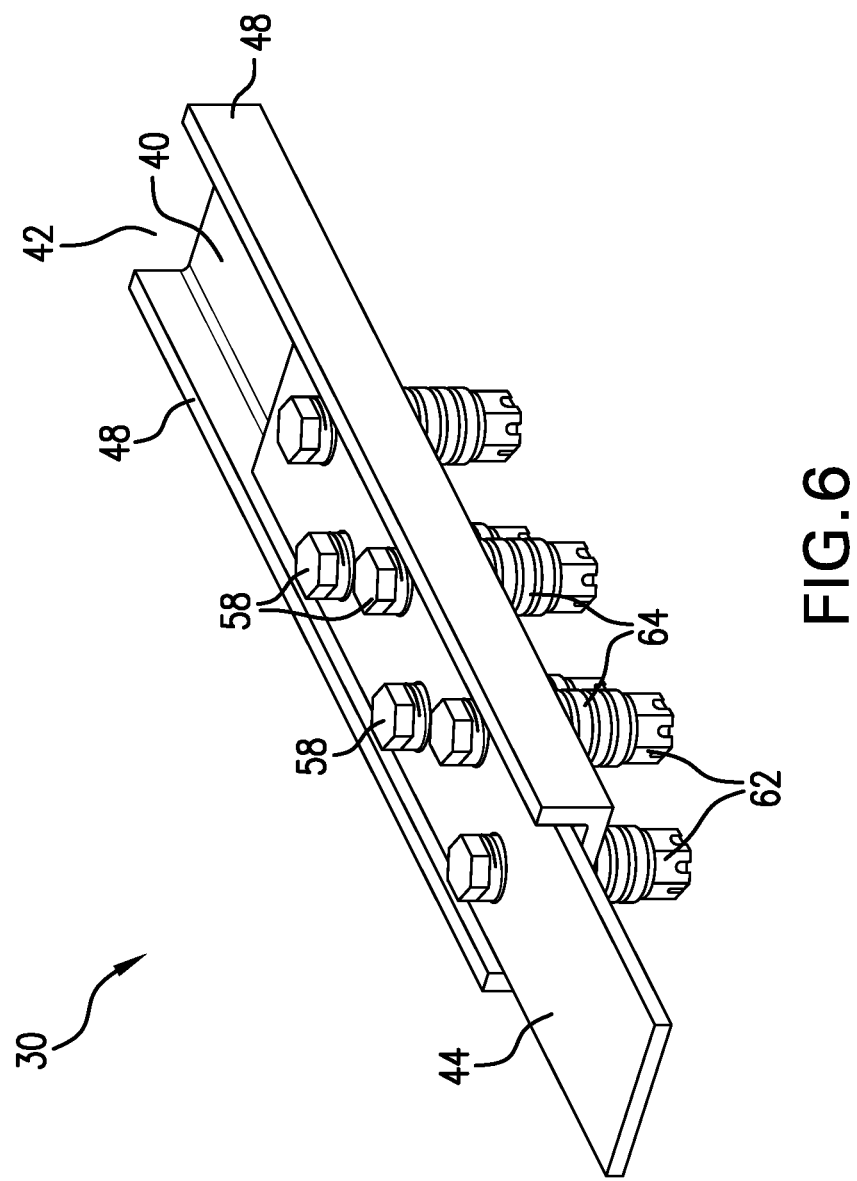
FIG. 6 is a perspective view of another strut according to an embodiment.
Figure 7:
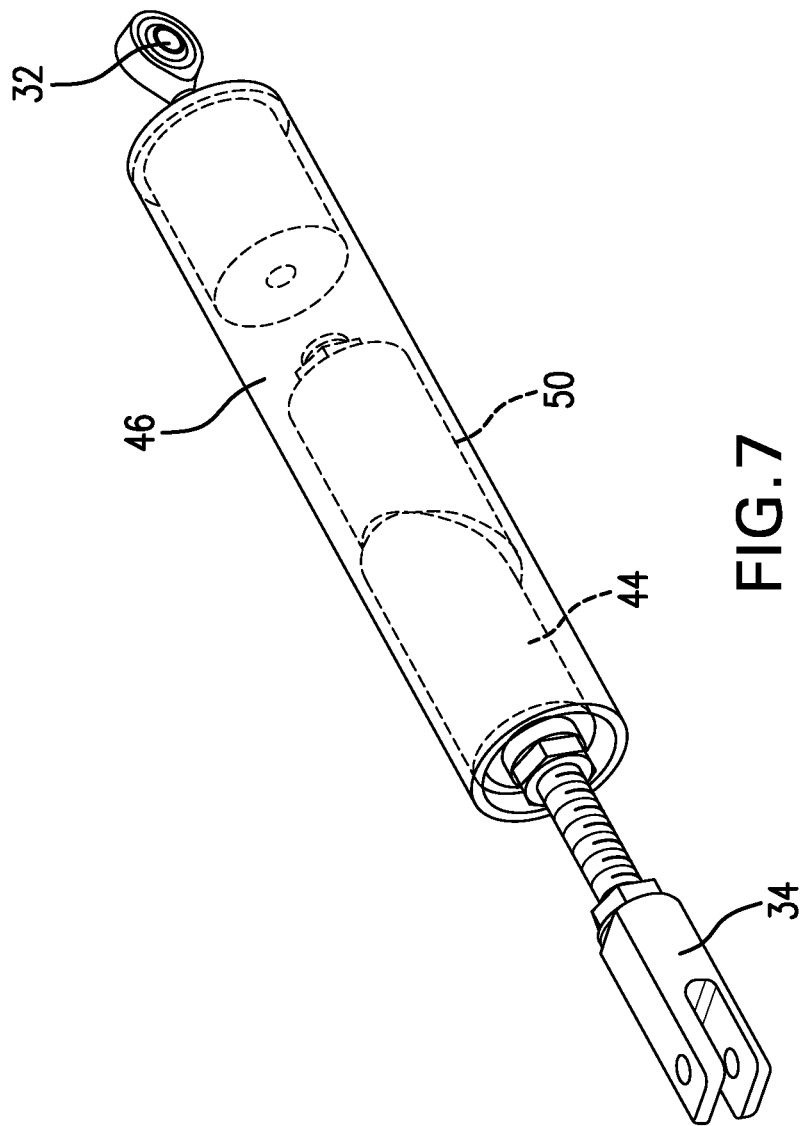
FIG. 7 is a perspective view of another strut according to an embodiment.

Referring now to FIGS. 2-7, an example of the strut 30 for restraining and stabilizing an engine 24 according to an embodiment is illustrated in more detail. The strut 30 includes a first member 40 formed from any suitable material, including but not limited to steel, aluminum, a metal alloy, and a plastic for example. The first member 40 may have a generally planar configuration, or alternatively may have a configuration that defines a hollow interior cavity 42. In the illustrated, non-limiting embodiment, the first member 40 is a channel, such as a C-shaped channel or a U-shaped channel for example. However, embodiments where the first member 40 has another configuration or shape, such as a cylindrical tube as shown in FIG. 5, for example, are also within the scope of the disclosure.

A second member 44 is located adjacent a first surface 46 of the first member 40, such as within the cavity 42. The second member is also formed from any suitable material, such as steel, aluminum, a metal alloy, and a plastic for example. In embodiments where the first member 40 defines a cavity 42, the second member 44 may have a size and shape generally complementary to or smaller than the cavity 44. In such instances, the sidewalls 48 of the first member 40 restrict movement of the second member 44 in at least one direction relative to the first member 40. In the illustrated, non-limiting embodiment of FIGS. 2 and 3, the second member 44 is also a C-shaped or U-shaped channel. However, embodiments where the second member 44 has another configuration, such as a planar configuration (FIG. 4) or a cylindrical shape (FIG. 5) for example, are also contemplated herein.

Arranged between the first member 40 and the second member 44 is a first friction material 50. The first friction material 50 may be bonded to either the first surface 46 of the first member 40 or the adjacent surface 52 of the second member 44. In some embodiments, a second low friction guide material 54 may be disposed between the sidewalls 48 of the first member 40 and the corresponding sidewalls 56 of the second member 44. The second low friction guide material 54 is intended to maintain the alignment of the sliding member 56 assembly. In an embodiment, the second friction material 54 has a coefficient of friction less than that of the first friction material 50.

In an embodiment, as shown in FIGS. 4 and 5, another layer of friction material 51 may be arranged in overlapping arrangement with the surface of the second member 44, opposite the first member 40. The friction materials of the two layers 50, 51 may be substantially identical, or alternatively, may be different. As a result, the two layers of friction material 50, 51 are configured to sandwich the second member 44. In such embodiments, the layer of friction material 51 is positioned within the cavity 42 such that an outwardly facing surface of the friction material 51 does not extend beyond the sidewalls of the first member 40.

The second member 44 is connected to the first member 40 via one or more attachments 58, such as fasteners for example. In embodiments where a layer of friction material 51 is positioned over the second member 44, opposite the first friction material 50, the plurality of fasteners 58 also extend through the layer of friction material 51. In an embodiment, an elongated opening or slot 60 associated with each of the fasteners 58 is formed in the second member 44. The slot 60 is sized to allow limited movement of the second member 44 relative to the first member 40 in a single direction. In an embodiment, the elongated slot 60 generally extends in a direction parallel to the length of the strut 30 and to the sidewalls 48 of the first member 44.

A nut 62 is connected to a portion of the fastener 58 and a biasing mechanism 64, such as a helical spring for example, is arranged concentrically with the fastener 58 between the second member 44 and the nut 62. The biasing force of the biasing mechanism 64 is configured to urge the second member 44 into contact with the first frictional material 50. In an embodiment, the nut 62 may be used to partially compress, and therefore pre-load the biasing mechanism 64. This pre-load provides a normal force that, in conjunction with the coefficient of friction of the first friction material 50, opposes movement of the second member 44 relative to the first friction material 50.

In addition, one or more openings 66 may be formed in the portion of the second member 44 arranged in contact with the first friction material 50. The plurality of openings 66 are sized to provide a passageway to prevent wear particles or debris generated by movement of the second member 44 relative to the first friction material 50 from being trapped between the first friction material 50 and the second member 44.

When mounted within an aircraft 20, the first member 40 of the strut 30 may be connected to the fuselage 22 and the second member 44 may be coupled to the engine 24, as shown in FIG. 1. However, embodiments where the first member 40 is connected to the engine 24 and the second member 44 is connected to the fuselage 22 or another portion of the aircraft 20 are also contemplated herein.

The coefficient of friction of the first and second friction materials 50, 54, as well as the material and the surface finish of the first and/or second members 40, 44 may be customized to achieve desired static and dynamic force characteristics. As a result, the strut 30 is operable in a first mode, as a solid strut, and a second mode, as a damper.

Because the dynamic coefficient of friction between the first friction material 50 and the second member 44 is less than the static coefficient of friction between the first friction material 50 and the second member 44, the normal force applied by the one or more biasing mechanisms 64 can be adjusted such that the strut 30 behaves in a first mode, similar to a solid strut, until a static frictional load threshold is exceeded. In an embodiment, the static frictional load threshold is selected based on an allowable limit of an engine 24 associated with the strut 30.

If the static frictional load threshold is exceeded due to steadily increasing thermal growth, a dimensional shift between the second member 44 and the first frictional material 50 will occur, such as via slot 60 for example. After this shift, the strut 30 will continue to operate in the first mode as a solid strut. However, if the static frictional load threshold of the strut 30 is exceeded due to a large increase in vibratory loads, such as due to vibration of the engine 24 coupled thereto for example, the strut 30 will operate in a second mode, in a manner similar to a friction damper. In the second mode, the strut 30 is configured to suppress the vibration transmitted thereto until the load falls below the static frictional load threshold. As a result, the strut is configured to restrict the transmission of vibration associated with movement of the engine to other component of the aircraft 20.

The strut 30 illustrated and described herein provides enhanced damping characteristics while fitting within a restricted size envelope. Although the strut 30 has been described with respect to an aircraft 20, the strut 30 may be used in any application where over constraint of a component is not desirable, such as fixed wing aircraft, high speed rotating machinery, or systems requiring restraint while operating over large thermal swings for example but are otherwise sensitive to a given load limitation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A strut for mounting an engine in an aircraft comprising:
    a first member defining a cavity;
    a second member;
    at least one friction material coupled to a surface of the first member, the at least one friction material being positioned between the first member and the second member, wherein the at least one frictional material and the second member are disposed within the cavity defined by the first member;
    at least one attachment coupling the first member, second member, and the at least one friction material; and
    a biasing mechanism associated with the at least one attachment, wherein a biasing force of the biasing mechanism biases the second member into engagement with the at least one frictional material to create a static frictional load between the first and second members.

2. The strut according to claim 1, wherein the strut is operable in one of a first mode and a second mode in response to a load applied to at least one of the first member and the second member.

3. The strut according to claim 2, wherein in the first mode, the strut operates as a solid strut such that the first member does not move relative to the second member while passing the load from the first member to the second member.

4. The strut according to claim 2, wherein the strut is operable in the first mode when the load applied to at least one of the first member and the second member is less than the static frictional load.

5. The strut according to claim 2, wherein in the second mode, the first member does slides relative to the second member under a vibratory load such that the strut operates as a damper to the vibratory load.

6. The strut according to claim 2, wherein the strut is operable in the second mode when the load applied to at least one of the first member and the second member exceeds the static frictional load of the strut due to vibratory loads.

7. The strut according to claim 1, wherein the attachment extends through at least one slot formed in the second member, such that the second member is movable relative to the at least one friction material and the first member.

8. The strut according to claim 7, wherein movement of the second member relative to the at least one frictional material and the first member partially relieves a load applied to one of the first member and the second member by allowing relative movement between the first second member until the static frictional load is below a threshold at which point the static frictional load prevents additional movement between the first and second members.

9. The strut according to claim 1, wherein the at least one friction material includes a first friction material positioned adjacent a surface of the second member and a second friction material positioned adjacent an opposite surface of the second member.

10. The strut according to claim 1, wherein the at least one friction material coupled to a surface of the first member includes a plurality of friction materials.

11. The strut according to claim 1, wherein the first member is connected to a portion of the engine and the second member is connected to a fuselage of the aircraft.

12. The strut according to claim 1, wherein the first member is connected to a fuselage of the aircraft and the second member is connected to a portion of the engine.

13. An aircraft comprising:
    an engine;
    a strut for mounting the engine to an adjacent component of the aircraft, the strut having a first member and a second member, wherein the strut is operable in one of a plurality of modes in response to a load applied to at least one of the first member and the second member, and in a first mode of the plurality of modes, the strut absorbs vibrations from the engine between the first member and the second member.

14. The aircraft of claim 13, wherein the plurality of modes further includes a second mode where the strut operates as a solid strut.

15. The aircraft of claim 14, wherein the plurality of modes further includes a third mode where the strut allows relative movement between a first member and a second member if the frictional force generated between the first member and the second member is overcome.

* * * * *